Sept. 15, 1970  B. BARENYI  3,528,314
SAFETY STEERING WHEEL FOR MOTOR VEHICLES
Filed July 30, 1968
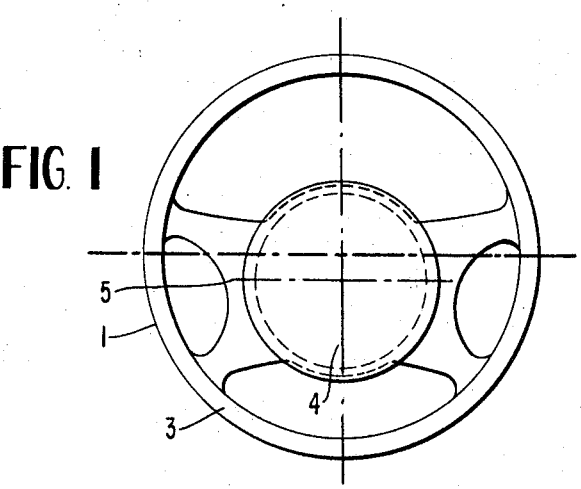
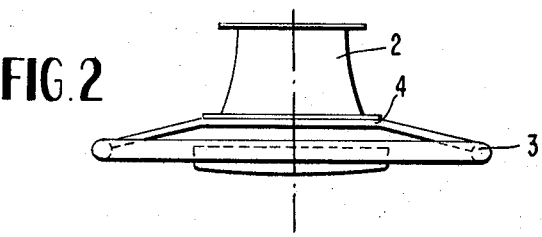
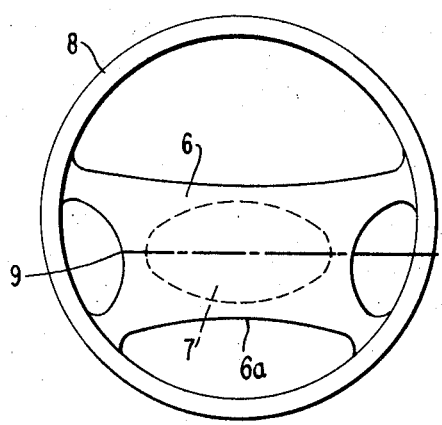
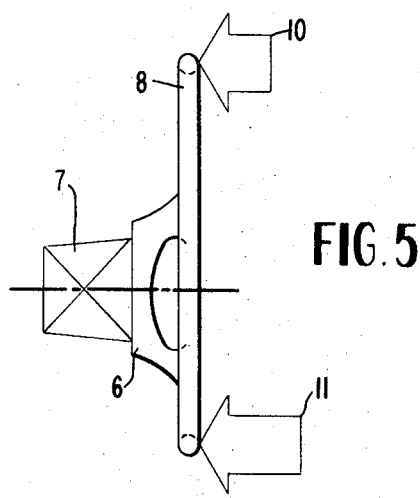
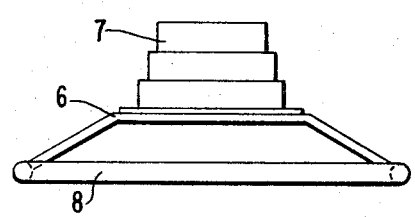
INVENTOR
BÉLA BARÉNYI
BY Craig & Antonelli
ATTORNEYS United States Patent Office 3,528,314
Patented Sept. 15, 1970

1

3,528,314
SAFETY STEERING WHEEL FOR MOTOR
VEHICLES
Béla Barényi, Stuttgart-Vaihingen, Germany, assignor to
Daimler-Benz Aktiengesellschaft, Stuttgart-Unterturkheim, Germany
Filed July 30, 1968, Ser. No. 748,844
Claims priority, application Germany, Aug. 2, 1967,
1,630,327
Int. Cl. B62d 1/04
U.S. Cl. 74—552                     13 Claims

ABSTRACT OF THE DISCLOSURE

A safety steering wheel for a motor vehicle which is connected with the steering column by the interposition of a deformation member and which, reinforced or inherently rigid substantially only in its lower half, has a greater form rigidity than the deformation member.

The present invention relates to a safety steering wheel for motor vehicles which is connected with the steering column by the interposition of a deformation member.

With the known types of constructions of safety steering wheels, there exists the disadvantage that the steering rim is connected with the deformation member by way of relatively small hubs. In case of an impact of the driver against the steering wheel, the steering wheel therefore yields, and the small, coaxial hub base body still leads frequently to considerable injuries of the driver notwithstanding the favorable yieldingness as such.

The present invention aims at avoiding this disadvantage with a safety steering wheel of the aforementioned type and above all at creating as large as possible an impact surface which is angularly adjustable and which abuts with a large surface against the body of the driver.

The present invention essentially consists in that the steering wheel, reinforced or rigid substantially only in its lower half, possesses a greater form rigidity than the deformation member. The possibility is created thereby that in case of an impact of the driver, at first the deformation member yields and the steering wheel is able to abut with the entire surface against the chest of the driver.

An extraordinarily advantageous type of construction of the present invention, in which one avoids far-reachingly that the lower portion of the steering rim is bent out of the plane of the hub base body in case of an impact, is achieved if a large-surfaced hub base body is provided extending essentially only over the lower half of the steering wheel and secured essentially only at the lower half of the steering wheel rim.

In order to avoid with still greater certainty that in case of a very strong impact the lower part of the steering wheel rim deforms nevertheless, it is advantageous if the lower edge of the hub base body extends approximately rectilinearly. An impact surface is created thereby which far-reachingly prevents also in this case serious injuries in comparison to the constructions known heretofore.

In order to improve the angular adjustability, provision may be further made that the deformation pot provided as deformation member is arranged offset downwardly with respect to the steering wheel center. The deformation pot may thereby have an oval cross section whose major diameter or major axis is disposed in the horizontal direction.

Accordingly, it is an object of the present invention to provide a safety steering wheel which avoids by simple means the aforementioned drawbacks encountered in the prior art.

2

A further object of the present invention resides in a safety steering wheel in which the steering wheel rim is connected with the deformation member by way of a relatively large hub.

A further object of the present invention resides in a safety steering wheel for motor vehicles which provides as large as possible an impact surface in order to further enhance the safety of the driver.

Still a further object of the present invention resides in a safety steering wheel for motor vehicles of the type described above which is connected with the steering column by way of a deformation member in such a manner that in case of impact, at first the deformation member yields while the steering wheel abuts with its entire surface against the chest of the driver.

These and further objects, features, and advantages of the present invention will become more obvious from the following description when taken in connection with the accompanying drawing which shows, for purposes of illustration only, two embodiments in accordance with the present invention, and wherein:

FIG. 1 is a plan view on a safety steering wheel according to the present invention;

FIG. 2 is a view from above on the steering wheel of FIG. 1;

FIG. 3 is a plan view on a further embodiment of a safety steering wheel according to the present invention;

FIG. 4 is a view from above on the safety steering wheel of FIG. 3; and

FIG. 5 is a right side view of the safety steering wheel of FIG. 3.

Referring now to the drawing wherein like reference numerals are used throughout the various views to designate corresponding parts and more particularly to FIG. 1, the safety steering wheel 1 illustrated in this figure is connected with the steering column (not shown) by way of a deformation pot 2 which tapers in the direction toward the steering column. The steering rim 3 is connected with the deformation pot 2 by way of a hub base body 4 of relatively large surface. The hub base body 4 extends essentially only over the lower half of the steering wheel so that favorable visibility conditions on the instruments remain preserved. The connection of the steering wheel rim 3 with the hub base body 4 takes place also essentially in the lower half of the steering rim 3. The connecting places are thereby so selected that a good gripping is assured. By such a construction of the safety steering wheel, one avoids above all an excessively large deflection or deviation of the lower portion of the steering wheel rim 3 out of the plane of the hub base body 4 in case of an impact of the driver. The deformation pot 2 which possesses a lesser form-rigidity than the lower half of the steering wheel is arranged offset downwardly with respect to the steering wheel center. The tilting axis 5 is thereby displaced out of the steering wheel center which represents an advantageous improvement of the angular adjustability of the safety steering wheel 1.

In the embodiment according to FIGS. 3 to 5, the securing surface of the hub base body 6 at the deformation pot 7 is clearly located below the plane of the steering rim 8. The hub base body 6 also extends essentially only over the lower half of the safety steering wheel and is secured at the steering rim 8 also essentially only at the lower half thereof. The lower edge 6a of the hub base body 6, as seen in FIG. 3, extends approximately rectilinearly. The deformation pot 7, also offset downwardly with respect to the steernig wheel center, possesses an oval cross section whereby its larger diameter is disposed in the horizontal direction. An even more favorable angular adjustabiilty is achieved thereby because the deformation member can be constructed relatively soft about the horizontal axis which is simultaneously the tilting axis 9.

The load conditions of a safety steering wheel according to the present invention, as illustrated in FIG 5, which are valid in an analogous manner also for the embodiment according to FIGS. 1 and 2, demonstrate the advantageous force absorption of such safety steering wheel. The safety steering wheel which is either inherently rigid or reinforced, possesses a greater form rigidity than the deformation pot 7, whereby at first, after an impact of the driver, the deformation pot 7 is deformed which leads to the consequence that the steering rim 7 tilts and is able to abut against the chest of the driver. Thereafter, or while the hub base body 6 already also abuts against the chest of the driver, the dissipation, properly speaking, of the impact energy takes place in the deformation pot 7. The differing form rigidity is indicated by the arrows 10 and 11, illustrated of different lengths.

While I have shown and described only two embodiments in accordance with the present invention, it is understood that the same is not limited thereto, but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A safety steering wheel for motor vehicles which is connected with a steering column by the interposition of a deformation member, characterized in that the steering wheel offers in effect greater rigidity substantially in its lower half and possesses a greater form rigidity than the deformation member.

2. A safety steering wheel according to claim 1, wherein the steering wheel is reinforced substantially only in its lower half.

3. A safety steering wheel according to claim 1, wherein the steering wheel is inherently more rigid substantially only in its lower half.

4. A safety steering wheel with a steering rim according to claim 1, wherein a hub base body of large surface is provided which extends substantially only over the lower half of the steering rim and is secured substantially only at the lower half of the steering rim.

5. A safety steering wheel according to claim 4, wherein the lower edge of the hub base body extends approximately rectilinearly.

6. A safety steering wheel according to claim 5, wherein the deformation member includes a deformation pot which is arranged offset downwardly with respect to the steering wheel center.

7. A safety steering wheel according to claim 6, wherein the deformation pot has an oval cross section whose major diameter is disposed essentially in the horizontal direction.

8. A safety steering wheel according to claim 1, wherein the deformation member includes a deformation pot which is arranged offset downwardly with respect to the steering wheel center.

9. A safety steering wheel according to claim 8, wherein the deformation pot has an oval cross section whose major diameter is disposed essentially in the horizontal direction.

10. A safety steering wheel according to claim 1, wherein the deformation pot has an oval cross section whose major diameter is disposed essentially in the horizontal direction.

11. A safety steering wheel with a hub base body according to claim 1, wherein the lower edge of the hub base body extends approximately rectilinearly.

12. A safety steering wheel according to claim 4, wherein the steering wheel is inherently more rigid substantially only in its lower half.

13. A safety steering wheel according to claim 4, wherein the steering wheel is reinforced substantially only in its lower half.

References Cited

UNITED STATES PATENTS

| | | |
|---|---|---|
| D. 115,685 | 7/1939 | Carson. |
| D. 154,860 | 8/1949 | Macauley. |
| 2,828,645 | 4/1958 | Wilfert. |
| 2,946,869 | 7/1960 | Parks et al. |
| 3,016,764 | 1/1962 | Fredericks et al. _____ 74—552 |
| 3,364,785 | 1/1968 | Geller _____ 74—552 |

FRED C. MATTERN, Jr., Primary Examiner

F. D. SHOEMAKER, Assistant Examiner